(12) United States Patent
Kemple et al.

(10) Patent No.: US 8,407,961 B2
(45) Date of Patent: Apr. 2, 2013

(54) CONNECTING DEVICE FOR A FRAME STRUCTURE

(75) Inventors: Lorcan Kemple, Hard (AT); Lukas Mundwiler, Hoelstein (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/893,488

(22) Filed: Sep. 29, 2010

(65) Prior Publication Data
US 2011/0072741 A1 Mar. 31, 2011

(30) Foreign Application Priority Data
Sep. 30, 2009 (DE) .......................... 10 2009 045 209

(51) Int. Cl.
*E04D 13/18* (2006.01)

(52) U.S. Cl. ........ 52/506.03; 52/173.3; 52/202; 52/210; 52/506.04; 52/506.05; 52/506.06; 136/251; 136/244

(58) Field of Classification Search .................. 136/251, 136/244, 291, 623, 704; 438/64, 66; 52/173.3, 52/202, 204.5, 506.03, 506.04, 506.05, 506.06, 52/507, 210–212
See application file for complete search history.

(56) References Cited

U.S. PATENT DOCUMENTS

| | | | |
|---|---|---|---|
| 4,966,631 A * | 10/1990 | Matlin et al. .................. | 136/244 |
| 6,370,828 B1 * | 4/2002 | Genschorek .................... | 52/200 |
| 6,414,237 B1 * | 7/2002 | Boer .............................. | 136/251 |
| 7,531,741 B1 * | 5/2009 | Melton et al. ................. | 136/246 |
| 8,046,961 B1 * | 11/2011 | Cutting et al. ............... | 52/173.3 |
| 2004/0065036 A1 * | 4/2004 | Capozzo .................... | 52/506.03 |
| 2010/0313506 A1 * | 12/2010 | Schoell ....................... | 52/302.1 |

FOREIGN PATENT DOCUMENTS
DE 20 2006 014 047 U1 1/2007

* cited by examiner

*Primary Examiner* — Jeanette E. Chapman
(74) *Attorney, Agent, or Firm* — Crowell & Moring LLP

(57) ABSTRACT

A connecting device for a frame structure made of support profiles and crossbars for the arrangement of solar panels, as well as a frame structure with a connecting device, is disclosed. The connecting device has a base element, a receptacle element, and a locking device by which the receptacle element can be fixed relative to the base element on the base element. The base element has a fastening section as well as a support section with a support side facing the receptacle element. The receptacle element has a receptacle for a crossbar of the frame structure as well as an application section with an application side facing the base element. The locking device has a clamping device as well as a bearing device. An application area and at least one depression area are provided between the clamping device and the bearing device.

11 Claims, 3 Drawing Sheets

CONNECTING DEVICE FOR A FRAME STRUCTURE

This application claims the priority of German Patent Document No. 10 2009 045 209.5, filed Sep. 30, 2009, the disclosure of which is expressly incorporated by reference herein.

BACKGROUND AND SUMMARY OF THE INVENTION

The invention relates to a connecting device for a frame structure made of support profiles and of crossbars, in particular for the arrangement of solar panels. The invention also relates to a frame structure, in particular for the arrangement of solar panels with such a connecting device.

A frame structure has support profiles anchored in or on a substrate, e.g., in the ground, on which a grid of crossbars arranged lengthwise and crosswise is provided as a supporting frame. Plate-like elements, such as solar panels, are arranged on the crossbars in the desired alignment. The crossbars are, for example, assembly rails, which can be connected with one another simply via appropriately configured fastening devices and on which the plate-like elements can be arranged simply by means of correspondingly configured fastening devices. Connecting devices are provided between the support profiles and individual crossbars.

For anchorage in the substrate, the support profiles are often rammed into or screwed into the substrate so that a perpendicular alignment is not always guaranteed after driving in the same. German Patent Document No. DE 20 2006 014 047 U1 discloses a connecting device for a frame structure made of support profiles and of crossbars for the arrangement of solar panels and having an adjustment possibility, which makes an alignment of the crossbars on the support profiles possible.

This known connecting device has a base element, a receptacle element and a locking device, by means of which the receptacle element can be fixed relative to the base element on the base element. The U-shaped base element has two legs as a fastening section of the base element for arrangement on a support profile of the frame structure as well as a support section, which connects the two legs, with a support side facing the receptacle element. The legs of the U-shaped base element are provided with feed-through openings for clamping means featuring screws and nuts, which are fed through openings on the end of the corresponding support profile and can be clamped to fix the base element. The receptacle element is formed by two L-shaped parts, between which a receptacle for a crossbar of the frame structure is configured. The flanges of the L-shaped parts respectively form an application section with an application side facing the base element.

The locking device of this connecting device includes elongated holes, which are arranged in the mounting flanges and run transverse to the longitudinal extension of the crossbar accommodated in the receptacle. In addition, elongated holes are provided in the support section of the base element that can be overlapped crosswise with the elongated holes of the mounting flange, i.e., in the direction of the longitudinal extension of the crossbar accommodated in the receptacle. Screws with nuts as clamping means for fixing the receptacle element on the base element are respectively provided in the crossing elongated holes. After the four clamping means are loosened, the receptacle element is displaceable relative to the base element.

The disadvantage of the known solution is that the locking device has a plurality of clamping means, which are arranged to fix the receptacle element on the base element, each of which must be separately clamped. These connecting devices involve a lot of assembly work in particular in the case of solar parks with a plurality of support profiles.

The object of the invention is creating a connecting device for a frame structure, which does not have the aforementioned disadvantages and in particular permits a simple as well as flexible assembly of a frame structure.

According to the invention, the locking device has at least one clamping device as well as at least one bearing device and an application area and at least one depression area are provided between the clamping device and the bearing device.

When the locking device is in the clamped state, the receptacle element lies flat against the base element in the region of the application area. In the region of the depression area, the receptacle element and the base element are spaced apart from each other by a gap or by a undercut, which is produced due to the at least one depression area. If the at least one clamping device is loosened, the receptacle element is tilted around the tilting axis, which is formed by the transition section between the application area and the depression area. When the connecting device is in this state, the receptacle element can be displaced for adjustment relative to the base element. If the at least one clamping device is then clamped again, the receptacle element tilts back so that the receptacle element and the base element are again in contact with each other in the region of the application area. When the connecting device is in this state, the receptacle element is fixed in the desired alignment relative to the base element.

To adjust and fix the receptacle element relative to the base element, only the at least one clamping device must be loosened or clamped, thereby significantly reducing the assembly effort as compared to the known solution. In addition, one clamping device, which is advantageously configured as a clamping screw, and one bearing device, which is configured, for example, as a clamping screw or as a retaining rivet, e.g., with two rivet heads, suffice for the locking device. The connecting device according to the invention has a low number of parts and therefore can be manufactured especially economically.

For a compact configuration of the connecting device, the at least one clamping device and the at least one bearing device on the application section are provided advantageously within the receptacle of the receptacle element.

The connecting device is advantageously pre-assembled at the factory and made available to the user in the joined together state. As a result, besides a suitable tool, no additional parts of the connecting device have to be carried along separately. Advantageously, all clamping devices of the connecting device respectively have the same rotary engagement means so that only one type of tool is required to assemble and adjust the connecting device.

The at least one clamping device is advantageously provided in the application area and the at least one bearing device is advantageously provided in the at least one depression area, thereby guaranteeing simple adjustment of the receptacle element relative to the base element when the clamping device is in the loosened state.

A step is preferably provided between the application area and the at least one depression area, which renders a simple configuration of the tilting axis or of the depression area on the corresponding element of the connecting device possible. The step advantageously runs at an inclination, which includes, with the plane spanning from the application area, an angle of less than 90° and especially advantageously an angle in a range of 40° to 50°, whereby extreme tension peaks are avoided in the material of the corresponding element in the transition area between the depression area and the application area.

The step is advantageously provided on the support side of the support section of the base element, whereby, when the fixing device is in a loosened state, the receptacle element can be displaced in a simple manner relative to the base element.

Alternatively, the step is provided on the application side of the application section of the receptacle element. In another variation, a step is provided both on the support side of the support section of the base element and on the application side of the application section of the receptacle element, whereby an especially large gap is created between the base element and the receptacle element without significantly weakening the material strength of one of the elements of the connecting device.

The support section of the base element preferably has a fixing section projecting on the fastening section on at least one side of the fastening section and at least one part of the locking device is provided in the region of this fixing section. The part of the locking device arranged on the fixing section that projects on one side is still accessible from outside for fixing the receptacle element relative to the base element, even if the connecting device is arranged on the support profile. The at least one clamping device is advantageously provided as part of the locking device in the region of the fixing section.

The base element preferably has a first feed-through opening for the at least one clamping device and a second feed-through opening for the at least one bearing device in the support section, and the receptacle element has a first feed-through opening for the at least one clamping device and a second feed-through opening for the at least one bearing device in the application section, wherein at least one of these feed-through openings is configured as an elongated hole. The at least one elongated hole makes simple displacement possible in a range predetermined by the dimensions of the elongated hole.

One of the feed-through openings of an element is configured as a curved elongated hole, wherein the radius of the elongated hole corresponds to the distance of the elongated hole from the adjacent feed-through opening in the corresponding element and wherein the concave longitudinal side of the elongated hole faces this feed-through opening. Alternatively, at least the two feed-through openings of the receptacle element and of the base element are configured in the assembled state of the connecting device as opposing elongated holes that cross and overlap.

The first feed-through opening for the at least one clamping device in the support section of the base element is preferably configured as an elongated hole, thereby guaranteeing a simple adjustability of the connecting device and the crossbar accommodated therein. The first feed-through opening is preferably configured as a curved elongated hole, wherein the radius of the elongated hole corresponds to the distance of the elongated hole from the second feed-through opening in the base element and the concave longitudinal side of the elongated hole is facing this feed-through opening. When the connecting element is in a loosened state, the receptacle element can be swiveled around a swivel axis formed by the at least one bearing device relative to the base element.

One of the feed-through openings preferably has a threaded section for a thread arranged on at least one clamping device and/or for a thread arranged on at least one bearing device, whereby it is possible to dispense with additionally arranged clamping elements, such as, for example, nuts, for clamping the at least one clamping device and/or the at least one bearing device. As a result, the connecting device has substantially fewer individual parts, thereby making it even easier to handle and economical to manufacture.

The first feed-through opening preferably has a threaded section in the application section of the receptacle element for the at least one clamping device provided with a thread and the second feed-through opening has a threaded section in the support section of the base element for the at least one bearing device with a thread, thereby making the connecting device simple to clamp and loosen.

The receptacle element advantageously has a fixing device for fixing the crossbar accommodated in the receptacle, which includes a bore hole as well as a curved elongated hole spaced apart from the bore hole. The radius of the curved elongated hole corresponds advantageously to the distance of the elongated hole from the bore hole and the concave longitudinal side of the elongated hole is facing this bore hole. In addition, the fixing device includes at least one rear engagement element, which engages in a corresponding rear engagement groove configured on the crossbar and which can be swiveled around a clamping device fed through the bore hole. This makes it possible to simply adjust the inclination of the crossbar corresponding to the swivel range that is made available.

A frame structure according to the invention, in particular for the arrangement of solar panels, has several support profiles and several crossbars, wherein a connecting device is provided between at least one of the support profiles and at least one of the crossbars, which has the aforementioned features. The frame structure can be erected with little assembly effort.

The invention is explained in greater detail in the following on the basis of exemplary embodiments.

DETAILED DESCRIPTION OF THE DRAWINGS

As a rule, the same parts are provided with the same reference numbers in the figures.

Figure 1:
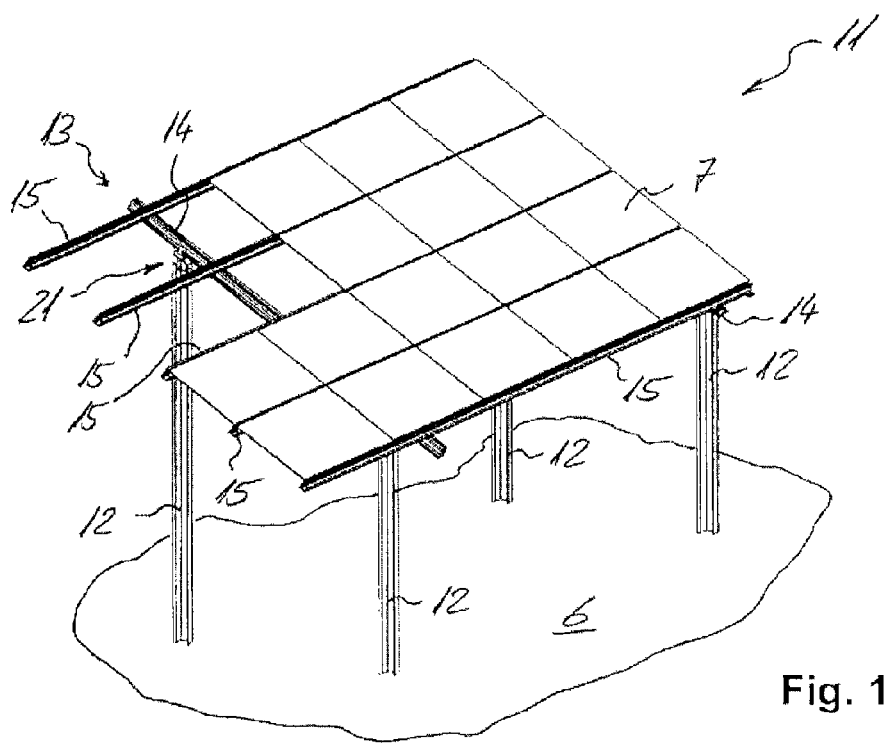
FIG. 1 is a perspective image of a frame structure for solar panels with connecting devices according to the invention.

The frame structure 11 for solar panels 7 depicted in FIG. 1 has several support profiles 12 rammed into the substrate as well as a grid 13 of several transverse crossbars 14, which run from support profile 12 to support profile 12, and of several longitudinal crossbars 15, which are arranged crosswise from the transverse crossbars 14. A connecting device 21 is respectively provided between the support profiles 12 and the transverse crossbars 14.

Figure 2:
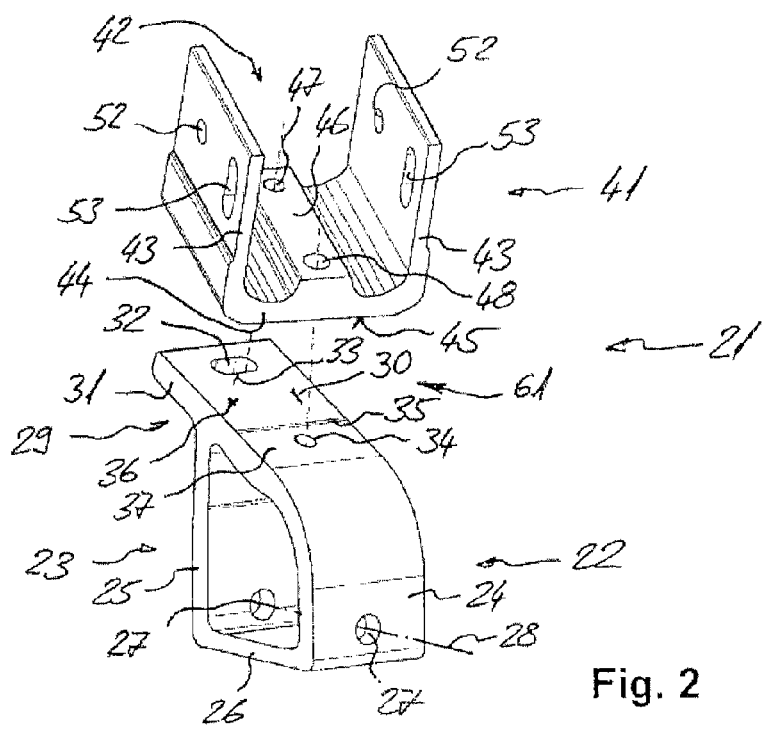
FIG. 2 is an exploded depiction of a connecting device.
Figure 3:
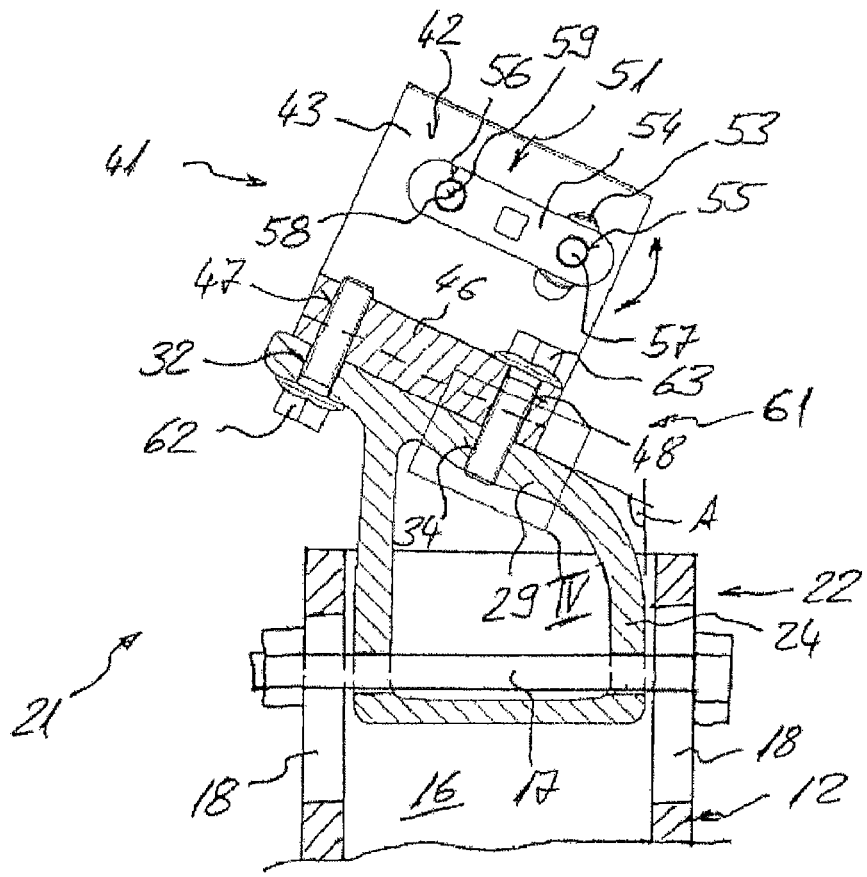
FIG. 3 is a sectional view of the connecting device according to FIG. 2.
Figure 4:
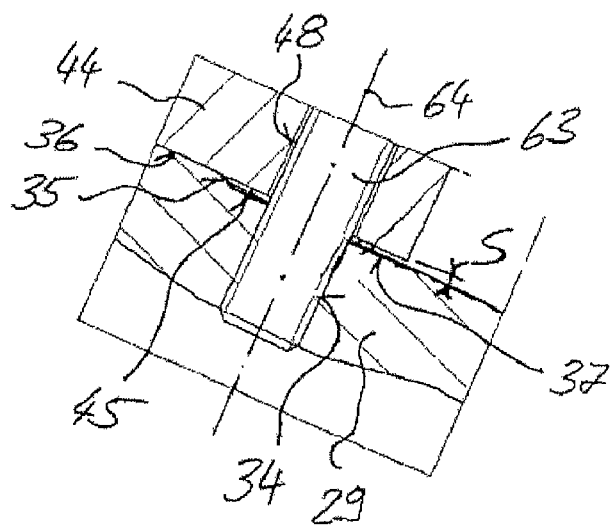
FIG. 4 is a detail IV of the connecting device according to FIG. 3.

The connecting device 21 shown in detail in FIGS. 2 to 4 has a base element 22 and a receptacle element 41, which can be fixed by means of a locking device 61 relative to the base element 22 on the base element.

The base element 22 has a fastening section 23 for arrangement on a support profile 12 of the frame structure 11, which is formed by two side walls 24 and 25 running parallel to one another as well as a connecting section 26 that connects them.

A feed-through opening 27 for a clamping device 17 configured as a clamping screw with nuts is provided in each of the side walls 24 and 25. The feed-through openings 27 lie on a common axis 28. With the fastening section 23 forward, the base element 22 is inserted into a receptacle area 16 provided on a support profile 12 and fixed at the desired height relative to the support profile 12 by means of the clamping device 17 on the support profile. To adjust the position of the connecting device 21 in the direction of the longitudinal extension of the support profile 12, two opposing elongated holes 18 are provided in the opposing walls of the support profile 12 along the longitudinal extension of the support profile 12.

In addition, the base element 22 has a support section 29 with a support side 30 facing the receptacle element 41. The plane spanning from the support section 29 encloses, with the plane spanning from the side wall 24, an angle A in the range of 90° to 140°. This angle A is advantageously selected corresponding to the inclination, which the transverse crossbar 14 accommodated in the receptacle element 41 is supposed to have and which almost corresponds to the desired inclination of the solar panels 7. The support section 29 of the base element 22 has a fixing section 31 projecting on the fastening section 23 or its side wall 25. A first feed-through opening 32 is provided in the fixing section 31 and a second feed-through opening 34 is provided in the support section 29 between the side walls 24 and 25 of the fastening section 23. The first feed-through opening 32 is configured as a curved elongated hole, whose radius corresponds to the distance from the second feed-through opening 34 and whose concave side 33 is facing the second feed-through opening 34. The second feed-through opening 34 has an internal thread.

A step 35 is provided on the support side 30 of the support section 29 between the first feed-through opening 32 and the second feed-through opening 34, thereby creating an application area 36 and a depression area 37, which is set back with respect to a plane spanning from the application area 36. The step 35 runs inclined at an angle of approx. 45° with respect to a plane spanning from the application area 36 of the support side 30.

The U-shaped receptacle element 41 has a receptacle 42 for the transverse crossbar 14 of the frame structure 11, which is limited on three sides. On the one hand, the receptacle 42 is limited by two opposing side walls 43 and by an application section 44 that connects the side walls 43. The application section 44 has an application side 45 facing the base element 22 and, on its opposing side, a reinforcing rib 46 running parallel to the side walls 43. There is a first feed-through opening 47, which has an internal thread, and a second feed-through opening 48 spaced apart from the first feed-through opening 47 in the region of the reinforcing rib 46.

A fixing device 51 is provided on each side wall 43 of the receptacle element 41 to fix the transverse crossbar 14 accommodated in the receptacle 42. The fixing device 51 includes a bore hole 52 in each side wall 43 and a curved elongated hole 53 spaced apart from the bore hole. The radius of the elongated hole 53 corresponds to the distance of the bore hole 52 from the elongated hole 53 and the concave side of the elongated hole 53 is respectively facing the bore hole 52. In addition, the fixing device 51 includes a rear engagement element 54, which can engage in a rear engagement groove 19 of the transverse crossbar 14 and which has two bore holes 55 and 56 each provided with an internal thread. A respective clamping screw 57 and 58 engages in the bore holes 55 and 56, and is fed through the bore hole 52 or through the elongated hole 53 in the side walls 43. The rear engagement element 54 can be swiveled around a swivel axis 59 formed by the clamping screw 58 to adjust the inclination of the transverse crossbar 14 accommodated in the receptacle 42.

The locking device 61 for fixing the receptacle element 41 on the base element 22 features, along with the feed-through openings 32 and 34 in the base element 22 and along with the feed-through openings 47 and 48 in the receptacle element 41, a first clamping screw as a clamping device 62, which is fed through the first feed-through opening 32 in the base element 22 and engages in the internal thread of the first feed-through opening 47 in the receptacle element 41. The clamping device 62 is provided in the application area 36 of the support section 29 of the base element 22 or as part of the locking device 61 in the region of the fixing section 31 of the support section 29 of the base element 22. In addition, the locking device 61 includes a second clamping screw as a bearing device 63, which is fed through the second feed-through opening 48 in the receptacle element 41 and engages in the internal thread of the second feed-through opening 34 in the base element 22. The bearing device 63 is provided in the depression area 37 of the support section 29 of the base element 22.

When the connecting device 21 is in the clamped state (see FIG. 3), the receptacle element 41 lies flat in the support area 36 of the support section 31. A gap S is created due to the set-back depression area of the support section 31 (see FIG. 4). The bearing device 63 is tightened with a lower torque than the clamping device 62 so that when the connecting device 21 is in a clamped state, a tensile force is exerted on the bearing device 63. The connecting device 21 is advantageously made available to the user in this state.

To adjust the receptacle element 41 relative to the base element 22, the clamping device 62 is loosened, wherein the receptacle element 41 tilts via the tilting edge formed by the step 35 in the direction of the side wall 24 of the fastening section 23. In this state the receptacle element 41 can be swiveled around a swivel axis 64 formed by the bearing device 63 without the bearing device 63 having to be loosened. If the clamping device 62 is clamped again, the receptacle element 41 tilts back again until it again lies flat on the support area 36 of the support section 31 of the base element 22. At the same time, the bearing device 63 is again subjected to tension, thereby fixing the receptacle element 41 in the desired alignment relative to the base element 22. Therefore, to adjust and fix the receptacle element 41 relative to the base element 22 only the clamping device 62 has to be loosened or clamped.

Figure 5:
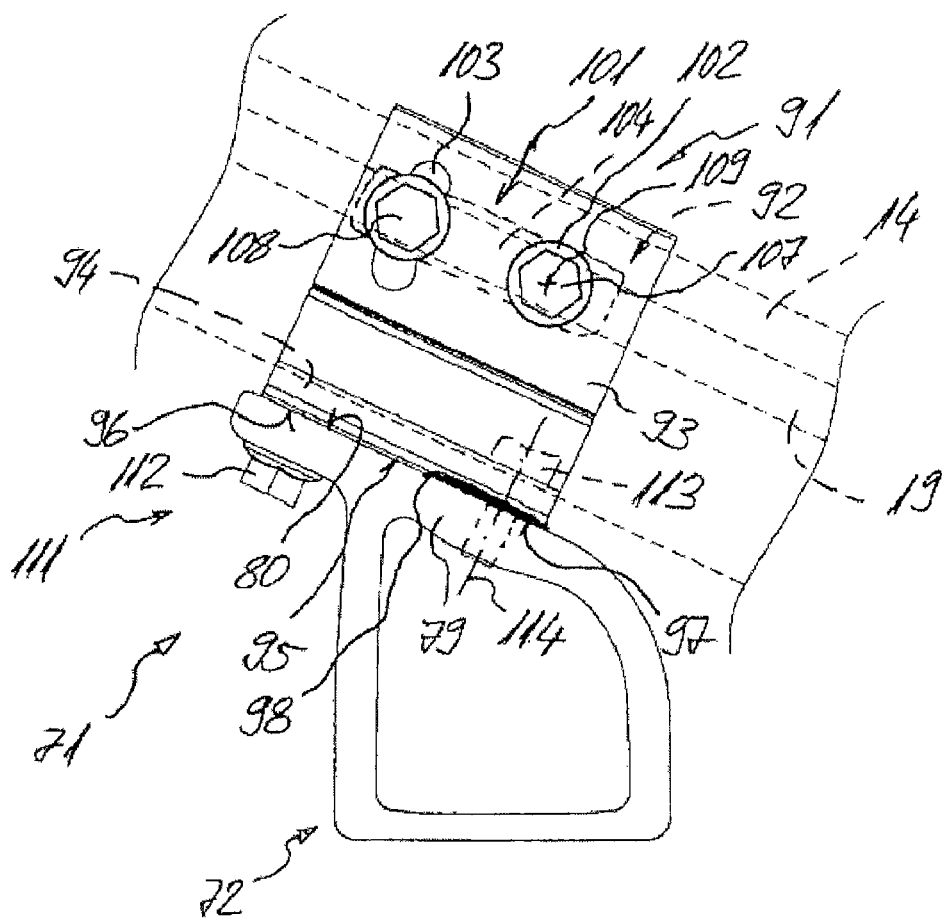
FIG. 5 is a side view of a second exemplary embodiment of a connecting device.

The connecting device 71 shown in FIG. 5 differs from the previously described connecting device 21 by the arrangement of the application area and of the depression area on the application side of the receptacle element as well as by the different embodiment of the fixing device 51 for fixing the transverse crossbar 14 accommodated in the receptacle 42. Otherwise, the elements of the connecting device 71 fundamentally correspond to the connecting device 21 with respect to the other features.

The support side 80 of the support section 79 of the base element 72 runs flat along a plane without a step being provided therein. The receptacle element 91 with the receptacle 92 for the transverse crossbar 14 has a step 98 on the application side 95 of the application section 94, which forms a support area 96 and a depression area 97 of the application side 95 between the clamping device 112 and the bearing device 113 of the locking device 111. When loosening the clamping device 112, the receptacle element 91 tilts towards the base element 72 and can be swiveled relative to it around the swivel axis 114 formed by the bearing device 113.

The fixing device 101 arranged on the side wall 93 of the receptacle element 91 has a rear engagement element 104, which engages in the rear engagement groove 19 of the transverse crossbar 14 and can be clamped via the clamping screws 107 and 108 to fix the transverse crossbar 14 in the receptacle 92. In the case of the connecting device 71, the curved elongated hole 103 provided in the side wall 93 is provided above the clamping device 112 and the bore hole 102 provided in the side wall 93 is provided above the bearing device 113. The rear engagement element 104 can be swiveled around the swivel axis 109 formed by the clamping screw 107 to adjust the inclination of the transverse crossbar 14 accommodated in the receptacle 92.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting device for a frame structure made of support profiles and crossbars, comprising:
   a base element;
   a receptacle element; and
   a locking device, wherein the locking device fixes the receptacle element on the base element;
   wherein the base element includes a fastening section which is arrangeable on a support profile of the frame structure and a support section with a support side facing the receptacle element;
   wherein the receptacle element includes a receptacle for receiving a crossbar of the frame structure and an application section with an application side facing the base element;
   wherein the locking device includes a clamping device and a bearing device; and
   wherein an application area and a depression area are provided in the support section of the base element.

2. The connecting device according to claim 1, wherein the clamping device is provided in the application area and the bearing device is provided in the depression area.

3. A connecting device for a frame structure made of support profiles and crossbars, comprising:
   a base element;
   a receptacle element; and
   a locking device, wherein the locking device fixes the receptacle element on the base element;
   wherein the base element includes a fastening section which is arrangeable on a support profile of the frame structure and a support section with a support side facing the receptacle element;
   wherein the receptacle element includes a receptacle for receiving a crossbar of the frame structure and an application section with an application side facing the base element;
   wherein the locking device includes a clamping device and a bearing device;
   wherein an application area and a depression area are provided between the clamping device and the bearing device; and
   wherein a step is provided between the application area and the depression area.

4. The connecting device according to claim 3, wherein the step is provided on the support side of the support section of the base element.

5. A connecting device for a frame structure made of support profiles and crossbars, comprising:
   a base element;
   a receptacle element; and
   a locking device, wherein the locking device fixes the receptacle element on the base element;
   wherein the base element includes a fastening section which is arrangeable on a support profile of the frame structure and a support section with a support side facing the receptacle element;
   wherein the receptacle element includes a receptacle for receiving a crossbar of the frame structure and an application section with an application side facing the base element;
   wherein the locking device includes a clamping device and a bearing device;
   wherein an application area and a depression area are provided between the clamping device and the bearing device; and
   wherein the support section of the base element has a fixing section projecting on the fastening section on a side of the fastening section and wherein a part of the locking device is provided in a region of the fixing section.

6. A connecting device for a frame structure made of support profiles and crossbars, comprising:
   a base element;
   a receptacle element; and
   a locking device, wherein the locking device fixes the receptacle element on the base element;
   wherein the base element includes a fastening section which is arrangeable on a support profile of the frame structure and a support section with a support side facing the receptacle element;
   wherein the receptacle element includes a receptacle for receiving a crossbar of the frame structure and an application section with an application side facing the base element;
   wherein the locking device includes a clamping device and a bearing device;
   wherein an application area and a depression area are provided between the clamping device and the bearing device; and
   wherein the base element has a first feed-through opening for the clamping device and a second feed-through opening for the bearing device in the support section, wherein the receptacle element has a first feed-through opening for the clamping device and a second feed-through opening for the bearing device in the application section, and wherein at least one of the feed-through openings is configured as an elongated hole.

7. The connecting device according to claim 6, wherein the first feed-through opening in the support section is configured as the elongated hole.

8. The connecting device according to claim 6, wherein one of the feed-through openings has a threaded section for a thread arranged on the clamping device and/or for a thread arranged on the bearing device.

9. The connecting device according to claim 6, wherein the first feed-through opening in the application section has a threaded section for a thread of the clamping device and wherein the second feed-through opening in the support section has a threaded section for a thread of the bearing device.

10. A frame structure, comprising:
a plurality of support profiles;
a plurality of crossbars; and
a connecting device according to claim 1 provided between at least one of the plurality of support profiles and at least one of the plurality of crossbars.

11. The frame structure according to claim 10 in combination with a plurality of solar panels, wherein the frame structure supports the plurality of solar panels.

* * * * *